March 28, 1967 W. H. W. SCHULLER 3,311,688
CONTINUOUS PRODUCTION OF FILAMENTS
Filed Dec. 4, 1964
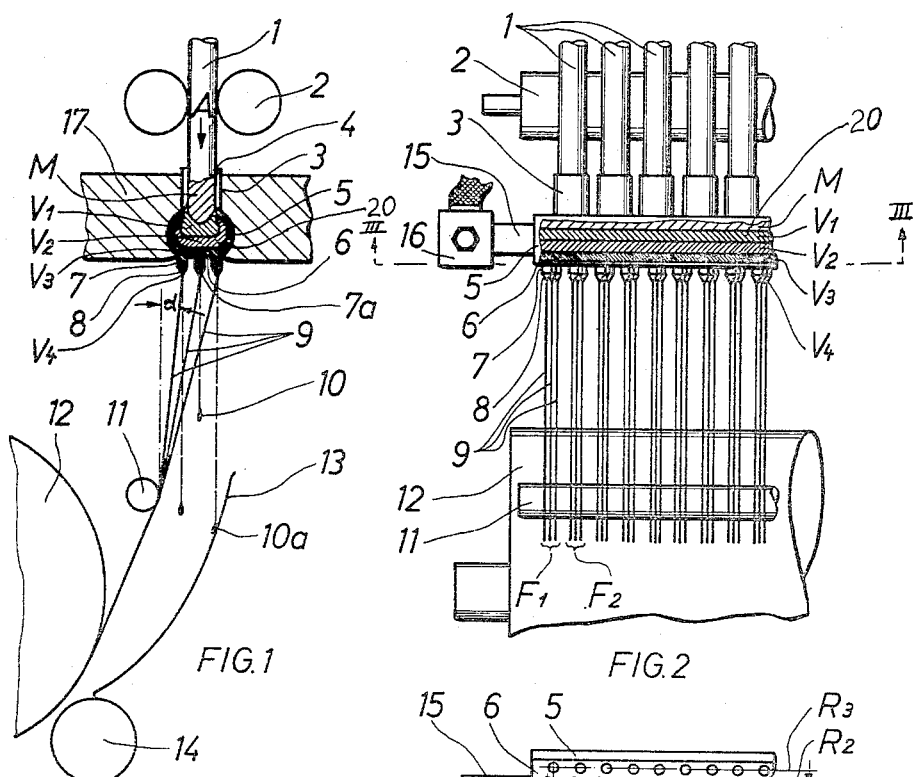
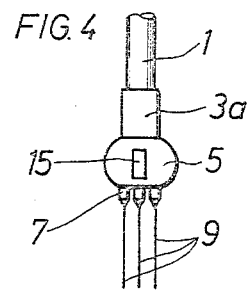
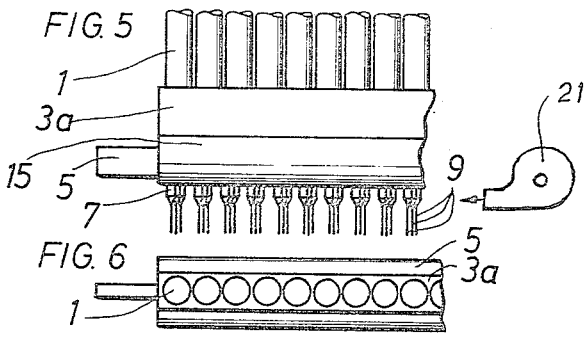
INVENTOR.
Werner Hugo Wilhelm Schuller
BY
Michael J. Striker United States Patent Office 3,311,688
Patented Mar. 28, 1967

3,311,688
CONTINUOUS PRODUCTION OF FILAMENTS
Werner Hugo Wilhelm Schuller, Dr. Kurt Huber-Strasse 14, Munich-Grunwald, Germany
Filed Dec. 4, 1964, Ser. No. 415,957
Claims priority, application Germany, Dec. 6, 1963, Sch 34,281
14 Claims. (Cl. 264—176)

This invention relates to continuous production of filaments from thermoplastic material. More particularly, the invention relates to a process and apparatus for simultaneously and continuously producing a relatively large number of closely spaced homogeneous filaments from heated vitreous or other thermoplastic material.

It is an object of the present invention to provide an apparatus for simultaneously and continuously producing a large number of filaments from heated thermoplastic material and to maintain such production over long periods of time despite occasional breaks of individual filaments.

Another object of the invention is to provide an apparatus of the aforesaid type which is capable of automatically drawing a new filament in the event a filament breaks.

A further object of the present invention is to provide an apparatus of the above type in which the formation of new filaments does not interfere with the filaments already being produced.

A still further object of the invention is to provide an apparatus of the above type which is capable of maintaining continuously fed thermoplastic material at a uniform temperature and of simultaneously producing a large number of closely spaced homogeneous filaments.

A concomitant object of the invention is to provide a process for simultaneously and continuously producing a large number of filaments from thermoplastic material in such a manner that, in the event of breakage of a filament, a fresh filament will be formed automatically and such formation will not interfere with the continuous production of the remaining filaments.

It is a still further object of the invention to provide a process according to which thermoplastic material may be supplied in the form of rods which are arranged and heated in such a manner as to reduce the possibility and the effects of sudden temperature changes on the liquefied material.

With the above objects in view, one feature of the invention resides in the provision of an apparatus for simultaneous production of filaments which includes a container defining an elongated substantially horizontal chamber into which thermoplastic material can be admitted. The chamber can be heated to raise the temperature of the thermoplastic material therein and is further provided with a plurality of nozzles directed downwardly and communicating with the chamber. The nozzles are spaced from each other in the direction of elongation of the chamber so that any filament issuing from any of the nozzles may be guided in a plane transversal to the chamber without interfering with the other filaments issuing from any of the other nozzles.

Another feature of the invention resides in the provision of a process for simultaneous production of filaments as aforesaid which includes heating a supply of thermoplastic material in a heating chamber to a liquid state and withdrawing downwardly from the chamber a plurality of spaced but parallel rows of spaced filaments, the filament in each row being, in the vicinity of the chamber, staggered with respect to the filaments in each other row. The filaments are then guided along inclined paths in parallel vertical planes which are substantially normal to the rows of filaments so that the filaments in the inclined paths remain spaced from each other.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly transverse sectional and a partly diagrammatic view of an apparatus which embodies the invention;

FIG. 2 illustrates a detail of the structure shown in FIG. 1;

FIG. 3 is a view as seen in the direction of arrows from the line III—III of FIG. 2;

FIG. 4 is a side elevational view of a portion of a modified apparatus;

FIG. 5 is a front elevational view of the structure shown in FIG. 4; and

FIG. 6 is a top plan view of the structure shown in FIG. 5.

Referring to FIG. 1 there is illustrated a tube-like container 5 defining a heating chamber 20. The top of the container 5 is provided with inlet means in the form of vertical tubes 3. The tubes 3 are slightly larger than, and permit passage therethrough of rods 1 which consist of thermoplastic material.

The lower portion of the container 5 is provided with a plurality of nozzles 7, each extending downwardly from the container and communicating with the chamber 20 therein. At the lowermost end of each nozzle 7 is a discharge opening 7a. A sizing device 11 is positioned below the nozzles 7 and is slightly laterally displaced therefrom in a direction toward a drawing drum 12. A small auxiliary drum 14 is arranged to cooperate with a guide plate 13 so as to deflect drops of thermoplastic material falling vertically from nozzles 7 toward the drum 12.

Feed rollers 2 are arranged above the container 5 to feed rods into tubes 3. The rollers 2 may be driven to slowly feed rods 1 in the direction of arrow A.

The container 5 may be heated in any conventional manner and is shown in FIG. 2 to be heated by electric current through a member 16 and a connecting member 15 which may be water-cooled and movable. The source of current is preferably connected to each end of the container 5 which latter is preferably made of heat-resistant noble metal alloy, e.g., platinum alloyed with gold or the like. The electric current uniformly heats the contents of the chamber 20 (which may be glass) thus producing, as the rods 1 are introduced, horizontal zones of uniform viscosity. The lower portion of the container 5 receives the largest amount of heat thus producing the highest glass temperature and consequently the highest fluidity of glass when the same enters the nozzles 7.

As best seen in FIG. 3, the container 5 has a lower portion 6 on which the nozzles 7 are mounted. The portion 6 is provided with nozzles arranged in parallel rows $R_1$, $R_2$ and $R_3$ spaced apart a distance $A_2$. The nozzles in each row are staggered with respect to those in the other rows. The distance, in the direction of elongation of the container 5, between such staggered nozzles is indicated to be the distance $A_1$. The nozzles are further arranged as shown, to form axially spaced groups with the leading nozzle of one group spaced a distance $A_3$ from the trailing nozzle of the next axially adjacent group. Distances $A_1$, $A_2$ and $A_3$ are so arranged that there is at least sufficient space between nozzles 7 to insure that individual drops of material can fall therefrom without interfering with one another.

The chamber 20 is insulated above its lower portion 6 by insulation 17. Preferably, insulation 17 does not extend below the uppermost ends of nozzles 7 in the region of the container 5 so that the nozzles 7 will be exposed to the atmosphere along their entire length. Preferably air or other cooling medium is circulated past the nozzles 7 while the apparatus is in operation to even further cool the nozzles for the purpose to be hereinafter explained. A blower 21, shown in FIG. 5, may be employed to provide a stream of coolant.

FIGS. 4, 5 and 6 illustrate a modified apparatus which differs from the above described apparatus in the manner in which the rods 1 are fed into the container 5. In the modified apparatus, the rods 1 of thermoplastic material are disposed in a row substantially adjacent each other. The material inlet 3a of the container 5 is therefore in the form of a continuous slot extending preferably along the entire length of the container.

In operation, the rods 1 of thermoplastic material are preferably slowly fed in the direction A into the elongated substantially horizontal chamber 20 of the container 5 through inlet means such as tubes 3, for example. The portions of the rods 1 in the chamber 20 are acted upon by the source of heat 15, 16 and are thereby transformed into a preheated mass M (in FIGS. 1 and 2). The mass M dissolves in the zone $V_1$, then homogenizes in a zone $V_2$ and reaches its lowest viscosity or highest fluidity in a zone $V_3$ in the lower portion of chamber 20. From the zone $V_3$, the fluid material passes through nozzles 7 to their outlet ends 7a. The length of the nozzles 7, together with the cooling which takes place therealong, causes a decrease in the fluidity of the thermoplastic material whereby the conditions are most favorable for the formation of a drop of material at the outlet end 7a. That is, the cooler and hence more viscous material slows down in nearing the end 7a, additional material builds up behind it to form first a core 8 and then a drop 10. Once formed, such a drop 10 falls by gravity in the normal manner and automatically draws behind it, without any other assistance, a tail 9 of material which forms a filament.

As seen in FIG. 1, such vertically falling drops 10 with their filament tails, impinge on secondary guide means here shown as an arcuate deflector 13. A drop 10a which has already contacted the deflector 13 is shown to be guided thereby toward the revolving auxiliary drum 14 and thence toward the surface of the drawing drum 12. In passing the drum 14, the drop 10a is carried away and thereby leaves the continuously following filament tail 9 to move into contact with and to be entrained by the revolving drum 12. Once drawn by drum 12, the filament 9 is guided along a path which brings it into contact with the sizing rod 11. Rod 11 is positioned in such a manner that when in contact therewith, the filaments 9 make a very small angle with the vertical. The filament 9 which is withdrawn from that nozzle 7 which is nearest to the drum 11, for example, makes a relatively small angle $\alpha$ with the vertical.

The sizing rod 11 is preferably covered with a smooth felt lining so that the filaments 9 passing thereover may be individually covered with sizing material which material is continuously and automatically replaced. It has been found advantageous to provide at least some incline (such as represented by the angle $\alpha$) for the path of the filaments rather than permitting these to drop vertically onto the drum 12 since, in such way, the tensile strength of the filaments is found to be increased.

The process of the present invention is continuous. When a rod 1 has been completely melted, a new rod or series of rods may be fed into the chamber 20 with only a minimum of thermal shock within the chamber 20 and without necessitating the shutdown, even for a short while, of the apparatus. In the formation of the filaments also, the process is a continuous one. In the event a filament 9 breaks, the apparatus described above immediately and automatically causes a drop to form at the outlet end 7a of the nozzle 7 of the broken filament, and the drop falls vertically by gravity toward the deflector or guide 13 thus entraining a filament behind it, and withdrawing such filament from the respective nozzle 7.

A particular advantage of the present invention and one which results primarily from the nozzle arrangement as shown in FIG. 3 is that the freely falling drops 10 with their new filament tails 9 do not interfere with and do not break any of the other filaments already guided along their inclined paths in contact with the rod 11. Thus, while having the advantages provided by an inclined path, still, new filaments may be formed automatically, without requiring a shutdown of the apparatus and without interfering with any of the other already formed filaments.

The distance $A_1$ between the filaments in each group F, as they are guided past the rod 11, may be approximately 1 to 2 mm. while the distance $A_3$ between the adjacent groups of filaments (e.g. $F_1$ and $F_2$) should not be less than 5 mm. to let newly formed drops fall through.

Tests have proven that the relationship between the power consumption and the hourly consumption of thermoplastic material such as glass, for example, is not linear but increases in the form of a flattening curve, thus making an increased hourly production as a result of reducing the frequency of equipment shutdown very profitable.

The optimum nozzle length and thus the amount of cooling to produce optimum drop forming conditions, can be chosen for each thermoplastic material to be used.

The zones M, $V_1$, $V_2$ and $V_3$ develop uniformly in the horizontal, i.e., in the direction of elongation of chamber 20 due to the continuous feeding of the rod material. Uniformity is also achieved in the vertical direction when the viscosity decreases towards the lower end of the chamber 20. Thus, it is possible to use containers having chambers 20 which are at least two or three feet long while maintaining the uniformity of the material such as enables the formation of uniform filaments.

The rods 1 of vitreous or other thermoplastic material have preferably a diameter approximately between 6 and 15 mm. The thicker the rods, the less frequently need they be replaced in production. For example, a rod 1 having a 12 mm. diameter and a length of 1.70 meters need be replaced approximately every 3 to 4 hours, depending on the filament drawing speed. The ends of all rods 1, being simultaneously fed into chamber 20, are simultaneously heated therein. A battery of 45 to 60 rods may thus be simultaneously fed into a single chamber 20 of proper length. The rods are preferably closely spaced to each other and evenly distributed along the length of the elongated chamber 20. The simultaneous and even feeding of the rods 1 by way of rollers 2, provides a constant pressure in the viscous mass in chamber 20.

To form a new drop when a filament breaks, the nozzles 7 preferably have an internal passage with a diameter which is at least 2.5 mm., in order to form a drop having a 4 to 5 mm. diameter. A drop of approximately the aforesaid size being required when the material is glass, in order to have sufficient weight so as to fall straight vertically without interfering with any of the other filaments. The formation of the desired drop requires a certain glass viscosity in order to form properly so as to entrain a filament. If the glass is too fluid upon exit from the nozzle 7 then it would merely "rain" drops without drawing a filament behind it. The temperature and the viscosity to form the desired drops are a function of the composition of the particular glass used.

According to the following example, with a glass batch of 68% $SiO_2$, 4–6% $Al_2O_3$, 15% $Na_2O+K_2O$ and $B_2O_3$ and the remainder earth alkalies, it has been found that viscosities, expressed in glass temperatures, were (a) at the bottom of the bushing 1,340° to 1,360° C. and
(b) at the nozzle outlet approximately 1,180° to 1,200° C.

at optimum operating conditions.

The ends 7a of nozzles 7 are spaced from the lower portion of container 5 for a number of reasons. First, the great heat developed at such lower portion would melt the fine filaments 9 once they are formed. Secondly, the length of such nozzles 7 which is preferably between 5 and 6 mm. for the glass composition indicated above, and not less than 4 mm., depending on the composition of glass used, aids in achieving the optimum conditions for drop formation. The nozzles 7 are tubular, may consist of the same alloy as container 5, and are preferably welded to the bottom of container 5. Thus the required temperature drop may be varied depending on the length of the nozzles used.

According to another feature of the invention, heat accumulation and turbulence at the bottom of container 5 is avoided by heat insulating only the upper part of container 5 with an insulator 17 which may consist, e.g., of alumina (an oxide of aluminum) or zirconium. The insulation 17 terminates at or slightly beyond the bottom of container 5. The nozzles 7 thus project freely into the atmosphere. Terminating the insulation 17 as stated also provides a lengthwise channel for the flow of cooling air or other medium from a blower 21, e.g., past the nozzles 7 and the hottest part of the filaments 9. A gentle uniform cooling effect is therefore provided, which can be intensified by providing a source of low suction at the other end of the rows of nozzles 7. An open curved metal tube having a lengthwise slot and connected to a suction source may, e.g., be provided.

The problem of providing a great number of nozzles to increase the filament production, while at the same time ensuring that after break of a filament a drop and a new filament are automatically built without destroying the adjacent filaments by a chain reaction, is solved according to the invention by disposing the nozzles in groups spaced from each other in the direction of elongation of the chamber 20 and the nozzles 7 in each group being staggered in the transversal direction of elongated chamber 20 and spaced from each other in the direction of elongation. Their spacing lengthwise and transversally is for example 6 mm. and therefore great enough to allow the undisturbed fall of a glass drop. Since this distance may be provided in two different directions, that is to say, lengthwise and in transverse of the container by providing the nozzles in staggered relation in several rows, the resulting lateral distance of the individual filaments, when disposed in a single line for example on the sizing device 11 or the surface of the drawing drum 12, may be considerably smaller and the number of filaments increased as compared to known constructions. The projection of the lengthwise distance $A_1$, of the nozzles within one group, but in different rows $R_1$, $R_2$, $R_3$, is preferably between 1 and 3 mm., while their transverse distance, that is to say the distance $A_2$ between the rows may be between 5 and 10 mm. The container 5 is positioned at a distance of, for example, 100 mm. in front of a vertical plane touching the drawing drum 12, so that the falling drops 10 do not contact the surface of the drum 12. The drops are guided by guide 13 to the surface of the drawing drum 12, by which the filaments 9 are drawn-off and at the same time the glass drops 10a thrown off by centrifugal force.

The quantity of sizing material applied by rod 11 preferably should not exceed 1% by weight of mass weight of the filaments.

If for example the vertical lines along which the glass drops 10 freely fall, lie within three different vertical planes each parallel to, but spaced by 6 mm. from the adjacent one, these planes also being parallel to, but spaced from a vertical plane touching the surface of drum 12, and if the vetrical lines within one and the same plane are also spaced from each other by 6 mm., the filaments, after being aligned in groups of three on the sizing rod 11 disposed in the space limited by the plane touching the surface of drum 12 and the ones containing the vertical lines of free fall, will have a lateral distance of 1.5 mm. within each group, $F_1$, $F_2$, etc., while the distance between each group and the next one is 6 mm. Thus any chain reaction of breaking filaments caused by a falling drop 10 is impossible, since at the worst a falling drop 10 in the middle plane may cause one additional filament 9 of its group momentarily to break, which is of little importance in production.

With the present invention up to 400 filament-forming positions can be provided on a container of a length of 90 cm. or 3 feet.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for the simultaneous production of filaments from thermoplastic material, in combination, a container defining an elongated substantially horizontal chamber; means for admitting thermoplastic material into said chamber; means for heating said thermoplastic material while in said chamber; a plurality of nozzles arranged at the bottom of said chamber and directed downwardly, said nozzles arranged in groups spaced from each other in the direction of elongation of said chamber, each group comprising more than two nozzles and the nozzles in each group being staggered in the transversal direction of said chamber and spaced from each other in said direction of elongation of said chamber and all said nozzles being located in vertical planes which are spaced from each other in said direction of elongation of said chamber; and guiding means for guiding the filaments emanating from said nozzles downwardly in said spaced vertical planes in a direction inclined to the vertical direction at which said filaments issue from the nozzles without any of said thus guided filaments interfering with any of the other thus guided filaments.

2. The combination as set forth in claim 1, wherein the spacing between said groups of nozzles is between 1 and 3 mm. in the direction of elongation of said chamber and between 5 and 10 mm. in the transverse direction.

3. In an apparatus according to claim 1, wherein the number of said nozzles substantially exceeds the number of said inlets so that the number of filaments substantially exceeds the number of rods of thermoplastic material extending at any one time into said chamber, said inlets including substantially vertical passages adapted to guide the rods in vertically extending position endwise into said chamber.

4. In an apparatus according to claim 1, wherein the distance in said direction of elongation between the closest nozzles of adjacent groups of nozzles exceeds substantially the distance in said direction between adjacent nozzles within such groups.

5. In an apparatus according to claim 1, wherein said means for guiding said filaments are located beneath said substantially horizontal chamber and are spaced from said rows of nozzles in said transverse direction so that filaments issuing from the furthest row are guided thereby beneath the remaining rows of nozzles along said inclined path.

6. In an apparatus for the continuous and simultaneous production of filaments from the thermoplastic material, in combination, an elongated substantially horizontal container; means for admitting thermoplastic material into said container; means for heating said thermoplastic material while in said container; a plurality of nozzles arranged at the bottom of said container directed downwardly, said nozzles arranged in groups spaced from each other in the direction of elongation of said container, each group comprising more than two nozzles and the nozzles in each group being staggered in the transversal direction of said container and located in vertical planes spaced from each other in said direction of elongation; first guide means for guiding the filaments issuing from a nozzle along an inclined path in the respective vertical plane which passes through said nozzle and is substantially normal to the direction of elongation of said container so that in the event of breakage of a filament any new filament issuing from the respective nozzle can proceed in a vertical direction without interfering with filaments issuing from other nozzles and guided by said first guide means; and secondary guide means adapted to engage any filament issuing from said nozzles and passing vertically downward from said nozzle at a point spaced from said nozzle and to guide the same towards said first guide means so as to be engaged by the same.

7. The combination set forth in claim 6, wherein said nozzles have a relatively great length so that said thermoplastic material passing therethrough is cooled during such passage whereby in the event of breakage of the formed filament a drop is formed at the outlet end of the nozzle which drop will have the tendency to compel the filament issuing from said nozzle to pass along a vertical path toward said secondary guide means without interfering with filaments guided by said first guide means.

8. In a process for the simultaneous production of filaments from thermoplastic material, the steps of heating thermoplastic material in a heating chamber to a liquid state; withdrawing in a direction downwardly from said chamber spaced filaments located in more than two substantially parallel rows, the filaments in each of said rows being in the vicinity of said chamber staggered with respect to the filaments in each of the other rows and all of said filaments being located in parallel vertical planes which are spaced from each other; and guiding the filaments along inclined paths in said spaced vertical planes substantially normal to the rows of filaments so that the filaments in said inclined paths remain spaced from each other.

9. In a process for the continuous and simultaneous production of filaments from vitreous thermoplastic material, the steps of continuously feeding a plurality of rods of vitreous thermoplastic material endwise into a common heating chamber; heating the thermoplastic material in the tially vertically downwardly from said chamber a plurality of horizontally spaced filaments located in more than two substantially parallel rows, the filaments in each of said rows being in the vicinity of said chamber staggered with respect to the filaments in each of the other rows and all of said filaments being located in parallel vertical planes which are spaced from each other; guiding the filaments along inclined paths in said spaced parallel vertical planes substantially normal to the rows of filaments so that the filaments in said inclined paths remain spaced from each other and in the event of breakage of a filament any new filament withdrawn from said chamber along a vertical path will not interfere with said filaments in said inclined paths.

10. In a process as set forth in claim 9, further including the step of guiding toward said filaments being guided in said inclined paths so as to merge therewith any new filaments which have by gravity been withdrawn in a vertical path to a point vertically spaced below said chamber.

11. In a process for the continuous and simultaneous porduction of filaments from vitreous and other thermoplastic materials, the steps of continuously vertically feeding rods of thermoplastic material endwise downwardly into an elongated substantially horizontal heating chamber; heating the portion of the rods of thermoplastic material which is in said chamber to a liquid state; discharging downwardly from said chamber a plurality of filaments located in more than two spaced substantially parallel rows with the filaments in each row being staggered in direction transverse to the rows with respect to the filaments in each of the remaining rows and all said filaments being located in parallel vertical planes which are spaced from each other; immediately cooling the leading ends of said filaments so that thermoplastic material accumulates at said leading ends and forms drops which descend by gravity and entrain the filaments of said material to withdraw the same vertically downwardly from the chamber; guiding said drops and the filaments entrained thereby from a point vertically spaced below said chamber in said spaced parallel vertical planes substantially normal to the extension of said rows into paths which are inclined with respect to the vertical direction of the freely falling drops; guiding said filaments along said inclined paths into a common plane but spaced from each other, the spacing between said filaments being such that the freely falling drops do not interfere with the filaments being guided along said inclined paths.

12. In an apparatus for the simultaneous production of filaments from thermoplastic material, in combination, a container defining an elongated substantially horizontal chamber; means for admitting thermoplastic material into said chamber; means for heating said thermoplastic material while in said chamber; a plurality of nozzles arranged at the bottom of said chamber and directed downwardly, at least some of said nozzles being arranged spaced from each other in longitudinal and transversal directions of said elongated substantially horizontal chamber and all said nozzles being arranged in vertical planes which are spaced from each other; and guiding means for guiding the filaments emanating from said nozzles downwardly in said spaced vertical planes in a direction inclined to the vertical direction at which said filaments issue from the nozzles wthout any of said thus guided filaments interfering with any of the other thus guided filaments due to the fact that said filaments are guided in said spaced parallel planes.

13. An apparatus according to claim 12, wherein all said nozzles are arranged spaced from each other in longitudinal direction and at least some of said nozzles are arranged spaced from each other in transversal direction of said elongated substantially horizontal chamber, and wherein said spaced vertical planes in which said guiding means guide the filaments extend normal to the elongation of said elongated substantially horizontal chamber.

14. An apparatus according to claim 12, wherein said spaced vertical planes in which said guiding means guide said filaments are located parallel to each other.

References Cited by the Examiner

UNITED STATES PATENTS

| | | |
|---|---|---|
| 2,566,438 | 9/1951 | Bakker et al. |
| 2,969,561 | 1/1961 | McCormick et al. |
| 3,008,183 | 11/1961 | Schuller et al. |
| 3,164,457 | 1/1965 | Mitchell et al. |

FOREIGN PATENTS

| | | |
|---|---|---|
| 1,052,073 | 3/1959 | Germany. |

ALEXANDER H. BRODMERKEL, *Primary Examiner.*

J. H. WOO, *Assistant Examiner.*